United States Patent
Zhang

(10) Patent No.: US 9,804,048 B2
(45) Date of Patent: Oct. 31, 2017

(54) PSEUDO DIFFERENTIAL PRESSURE SENSING BRIDGE CONFIGURATION

(71) Applicant: Rosemount Aerospace Inc., Burnsville, MN (US)

(72) Inventor: Weibin Zhang, Burnsville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 82 days.

(21) Appl. No.: 15/001,970

(22) Filed: Jan. 20, 2016

(65) Prior Publication Data
US 2017/0205299 A1    Jul. 20, 2017

(51) Int. Cl.
G01L 13/02    (2006.01)
G01L 9/06    (2006.01)
G01L 9/00    (2006.01)
G01L 13/00    (2006.01)

(52) U.S. Cl.
CPC ............ *G01L 9/0052* (2013.01); *G01L 13/00* (2013.01)

(58) Field of Classification Search
None
See application file for complete search history.

(56) References Cited

U.S. PATENT DOCUMENTS

| | | | |
|---|---|---|---|
| 6,473,711 B1 * | 10/2002 | Sittler | G01L 15/00 137/597 |
| 6,612,179 B1 | 9/2003 | Kurtz | |
| 7,057,247 B2 | 6/2006 | Kurtz et al. | |
| 7,201,067 B2 | 4/2007 | Kurtz et al. | |
| 7,343,808 B2 | 3/2008 | Kurtz et al. | |
| 7,526,962 B1 | 5/2009 | Kurtz et al. | |
| 7,673,518 B2 | 3/2010 | Kurtz | |
| 7,806,001 B1 | 10/2010 | Shaw | |
| 8,171,800 B1 * | 5/2012 | Chiou | G01L 9/0052 73/716 |
| 8,910,524 B2 | 12/2014 | Bemis et al. | |

(Continued)

FOREIGN PATENT DOCUMENTS

| DE | EP 2824438 A1 * | 1/2015 | ............ G01L 13/02 |
|---|---|---|---|
| JP | H05273068 A | 10/1993 | |

OTHER PUBLICATIONS

Extended European Search Report, for European Patent Application No. 17152332.7, dated Aug. 4, 2017, 21 pages.

*Primary Examiner* — Andre Allen
(74) *Attorney, Agent, or Firm* — Kinney & Lange, P.A.

(57) ABSTRACT

Apparatus and associated methods relate to generating a signal indicative of a differential pressure using a first absolute pressure sensor and a second absolute pressure sensor, each having a positive relation transducer configured to generate an electrical signal that increases in response to increasing pressure and a negative relation transducer configured to generate an electrical signal that decreases in response to increasing pressure. The first and second positive relation transducers of the first and second absolute pressure sensors, respectively, are electrically connected as a first leg of a Wheatstone bridge at a first output node. The first and second negative relation transducers of the first and second absolute pressure sensors, respectively, are electrically connected as a second leg of a Wheatstone bridge at a second output node. Both positive and both negative relation transducers are connected to a first and a second bias node of the Wheatstone bridge, respectively.

20 Claims, 7 Drawing Sheets

(56) References Cited

U.S. PATENT DOCUMENTS

| | | |
|---|---|---|
| 2006/0174718 A1 | 8/2006 | Morimoto |
| 2013/0247677 A1 | 9/2013 | Uchiyama et al. |
| 2014/0053652 A1 | 2/2014 | Kurtz |
| 2015/0204746 A1 | 7/2015 | Bemis et al. |
| 2015/0268113 A1 | 9/2015 | Takeuchi et al. |

* cited by examiner

PSEUDO DIFFERENTIAL PRESSURE SENSING BRIDGE CONFIGURATION

BACKGROUND

Differential pressure sensors are used to measure a difference between pressures of fluid environments. These fluid environments may be located nearby one another or at great distance one from another. Differential pressure sensors come in at least two varieties: i) true differential pressure sensors; and ii) pseudo differential pressure sensors. True differential pressure sensors provide fluid communication between each of the environments and to each of two sides of a differential pressure transducer, respectively.

Pseudo differential pressure sensing can be accomplished using two distinct absolute pressure sensors. Each absolute pressure sensor is exposed to one of the fluid environments so as to measure the fluid environment's absolute pressure. By taking the difference of resulting signals indicative of absolute pressures of the two absolute pressure sensors, a signal indicative of a difference between the two absolute pressures can be generated.

Various types of pressure transducers have various advantages and disadvantages. In some circumstances, for example, it may be undesirable to expose both sides of a differential pressure sensor to high pressures. In such cases, a pseudo differential pressure sensor may be preferable to a true differential pressure sensor. In some cases, the two fluid environments may be located at a great distance one from another. In such cases, use of two remote absolute pressure sensors may provide a good solution for measuring a pressure differential.

Pseudo differential pressure sensors may use two half bridges to construct a full Wheatstone bridge. Each half bridge may generate an electrical signal that corresponds to a pressure of one of the two locations or environments. The differential pressure is then represented by a difference between the signals of the two half bridges. If one of the two bridges, however, has a sensor failure, the system is rendered incapable of measurement of differential pressure.

SUMMARY

A pseudo differential pressure sensor includes a first absolute pressure sensor and a second absolute pressure sensor. Each of the first and the second absolute pressure sensors includes an elastically deformable membrane configured to deform in response to exposure to an environment having a pressure. Each of the first and the second absolute pressure sensors includes a first piezoresistor located on the elastically deformable membrane at a first region where increasing the pressure of the environment produces an increasing tensile strain in the first piezoresistor. Each of the first and the second absolute pressure sensors includes a second piezoresistor located on the elastically deformable membrane at a second location where increasing the pressure of the environment produces an increasing compressive strain in the second piezoresistor. The first and the second piezoresistors of both the first and second absolute pressure sensors are electrically connected in a Wheatstone bridge having a first voltage divider leg and a second voltage divider leg. The first voltage divider leg includes the first piezoresistor of the first absolute pressure sensor series connected to the first piezoresistor of the second absolute pressure sensor at a first output node. The second voltage divider leg includes the second piezoresistor of the first absolute pressure sensor series connected to the second piezoresistor of the second absolute pressure sensor at a second output node.

In some embodiments, a pseudo differential pressure sensor includes a first absolute pressure sensor and a second absolute pressure sensor. Each of the first and the second absolute pressure sensors includes an elastically deformable membrane configured to deform in response to exposure to an environment having a pressure. Each of the first and the second absolute pressure sensors includes a first piezoresistor located on a first surface region of the elastically deformable membrane that becomes increasingly convex in response to increasing pressure. Each of the first and the second absolute pressure sensors includes a second piezoresistor located on a second surface region of the elastically deformable membrane that becomes increasingly concave in response to increasing pressure. The first and the second piezoresistors of both the first and second absolute pressure sensors are electrically connected in a Wheatstone bridge having a first voltage divider leg and a second voltage divider leg. The first voltage divider leg includes the first piezoresistor of the first absolute pressure sensor series connected to the first piezoresistor of the second absolute pressure sensor at a first output node. The second voltage divider leg includes the second piezoresistor of the first absolute pressure sensor series connected to the second piezoresistor of the second absolute pressure sensor at a second output node.

A method of generating a signal indicative of a difference between a first pressure of a first environment and a second pressure of a second environment includes exposing a first absolute pressure sensor to the first environment having the first pressure. The method includes exposing a second absolute pressure sensor to the second environment having the second pressure. The method includes generating a first output signal indicative of a difference between the first pressure of the first environment and the second pressure of the second environment. The method includes generating a second output signal indicative of a difference between the first pressure of the first environment and the second pressure of the second environment. The second output signal is complementary to the first output signal. The method includes selecting a measurement signal from among the first output signal, the second output signal and the difference signal. The measurement signal is indicative of the difference between the first pressure of the first environment and the second pressure of the second environment.

DETAILED DESCRIPTION

Figure 1A:
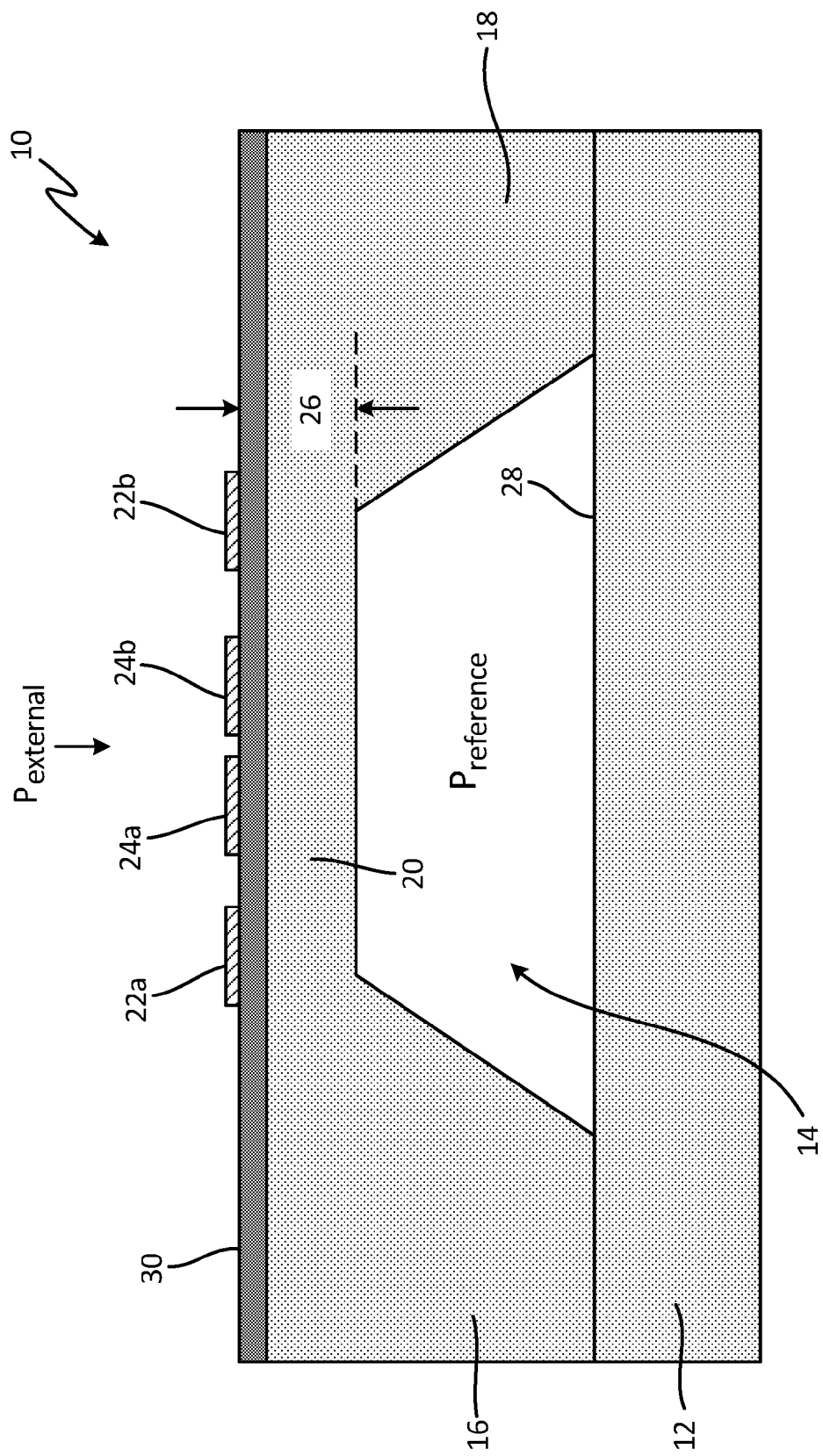
FIGS. 1A, 1B are side elevation views of an exemplary absolute pressure sensor, without and with a positive external pressure, respectively.

Absolute pressure sensors can be manufactured using piezoresistive materials. Such piezoresistive materials have a resistivity that changes in response to mechanical strain. The piezoresistive material can be formed in various ways. For example, some piezoresistive materials are deposited as thin films on a wafer or substrate. Some piezoresistive materials are formed by diffusing dopant species into a wafer or substrate. Some micro pressure sensors use an elastically deformable membrane as a member that is mechanically responsive to pressure changes.

The elastically deformable membrane can be located above a reference cavity in which a reference pressure can be maintained. The membrane can then deform in response to an externally applied pressure that is different from the reference pressure. Such a pressure differential can elastically deform the membrane. In some embodiments, a substrate or backing wafer may support the cavity and membrane to provide strength and/or to reduce a packaging stress. In some applications, the backing wafer can have a pressure through-hole aligning to the cavity. When a pressure through-hole is so provided, the reference pressure of the reference cavity can be provided by a fluid environment external to the cavity.

Piezoresistors can be formed on various surface regions of the elastically deformable membrane. Some of these surface regions can produce tensile strain in the piezoresistors located thereon. Some of these surface regions can produce compressive strain in the piezoresistors located thereon. By locating piezoresistors on both tensile strain producing surface regions and compressive strain producing surface regions, some piezoresistors have resistance that increase and some piezoresistors have resistances that decrease in response to elastic deformation. This measure of elastic deformation, in turn, can correspond to a difference between the externally applied pressure and the reference pressure of the reference cavity.

Pseudo differential pressure sensing can be accomplished using two of these absolute pressure sensors. Each absolute pressure sensor can be exposed to a different one of two environments or two locations between which a measurement of differential pressure is sought. A difference between each of the two measurements of the two environments or two locations can then be made by comparing a difference between the resistance changes of the piezoresistors of the two absolute pressure sensors. Each of the absolute pressure sensors can have two or more piezoresistors, at least one located on a tensile strain producing surface region and at least one located on a compressive strain producing surface region. This configuration results in one of the piezoresistors having a resistance that increases in response to an increasing externally applied pressure and one of the piezoresistors having a resistance that decreases in response to an increasing externally applied pressure.

The piezoresistors of the two absolute pressure sensors can be connected as a Wheatstone bridge. Judiciously ordering the connection of the piezoresistors of the two absolute pressure sensors in the Wheatstone bridge can be done so as to facilitate redundancy and robustness. Such a judicious ordering of piezoresistors can permit a pseudo differential pressure sensor to provide a signal indicative of a differential pressure even in the event that one or more of the individual transducers should fail. To accomplish such redundancy, each leg of the Wheatstone bridge includes a piezoresistor from each of the two absolute pressure sensors. Thus, even if one of the legs should fail, the non-failing leg provides a signal indicative of a differential pressure.

Figure 1B:
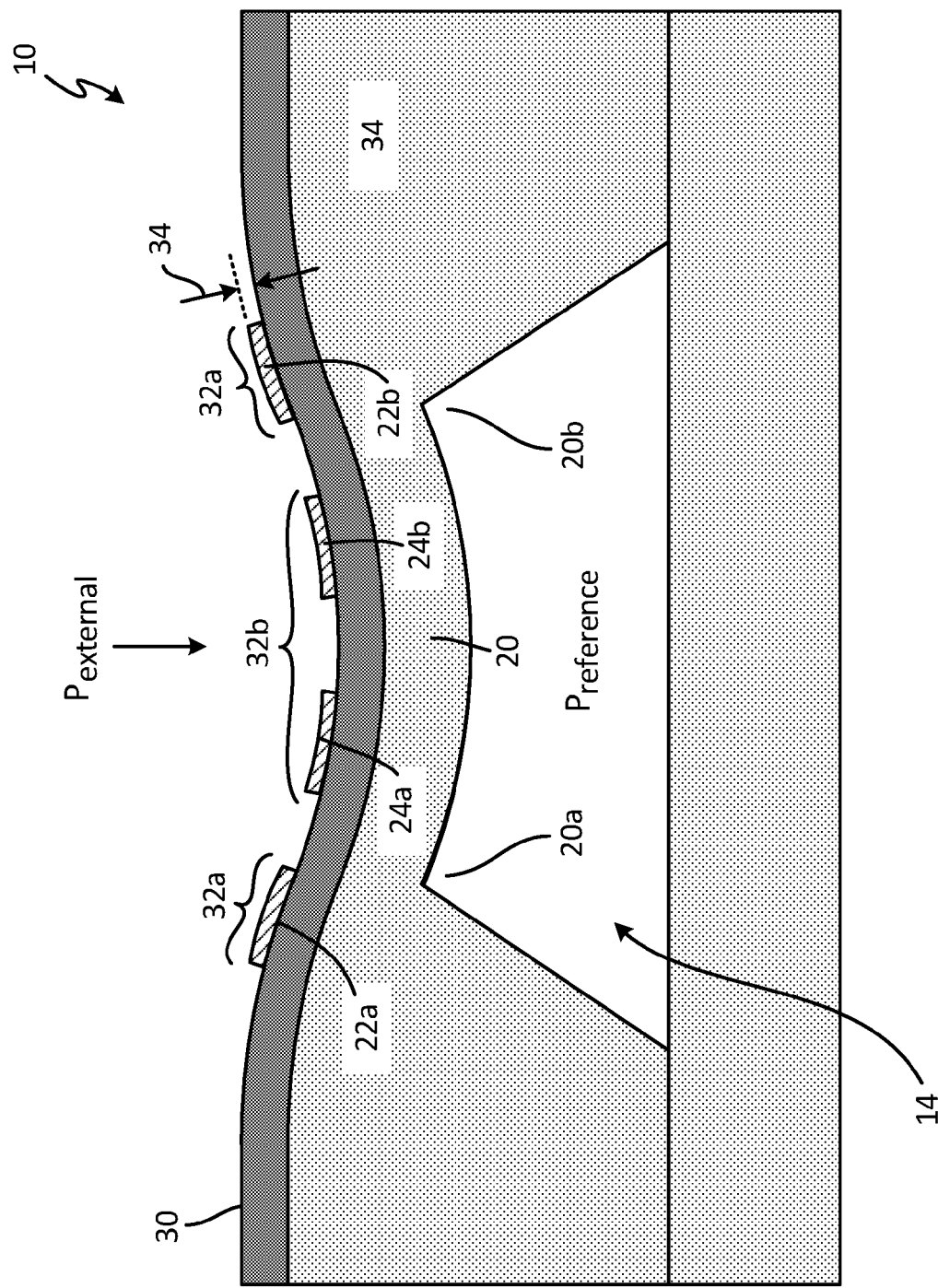

FIGS. 1A, 1B are side elevation views of an exemplary absolute pressure sensor, without and with a positive external pressure, respectively. In FIG. 1A, absolute pressure sensor 10 is shown cross-sectioned so as to reveal an inner reference cavity. Absolute pressure sensor 10 includes substrate 12, reference cavity 14, membrane support members 16, 18, elastically deformable membrane 20, and piezoresistors 22a, 22b, 24a, 24b. Elastically deformable membrane 20 forms a bridge that is suspended by and connects to both membrane support members 16, 18. Elastically deformable membrane 20 has a thickness 26 so as to permit a difference between an external pressure $P_{external}$ and a reference pressure $P_{reference}$ that exists within reference cavity 14 to cause elastically deformable membrane 20 to deflect toward cavity floor 28. In some embodiments a deflection limiter can provide a mechanical stop to limit the amount of deflection of elastically deformable membrane 20.

Each of piezoresistors 22a, 22b, 24a, 24b are intimately connected to top surface 30 of elastically deformable membrane 20. Because piezoresistors 22a, 22b, 24a, 24b are intimately connected to top surface 30 of elastically deformable membrane 20, piezoresistors 22a, 22b, 24a, 24b will deform commensurate with a deformation of the regions of top surface 30 to which piezoresistors 22a, 22b, 24a, 24b adhere. Thus, when elastically deformable membrane 20 deforms, so do piezoresistors 22a, 22b, 24a, 24b. When piezoresistors 22a, 22b, 24a, 24b deform (e.g., undergo compressive and/or tensile strain), resistances of piezoresistors 22a, 22b, 24a, 24b change in response to deformation of piezoresistors 22a, 22b, 24a, 24b.

Piezoresistors 22a, 22b, 24a, 24b have been located on top surface 30 of elastically deformable membrane 20 in order to deform in response to deformations of elastically deformable membrane 20. Top surface 30 may be made of a dielectric material such as, for example, silicon dioxide and/or silicon nitride. Piezoresistors 22a, 22b are located on regions of top surface 28 where piezoresistors 22a, 22b will experience tensile strain in response to external pressure $P_{external}$ exceeding reference pressure $P_{reference}$. Piezoresistors 24a, 24b are located on regions of top surface 30 where piezoresistors 24a, 24b will experience compressive strain in response to external pressure $P_{external}$ exceeding reference pressure $P_{reference}$.

FIG. 1B depicts absolute pressure sensor 10 shown in FIG. 1A, but in a deformed state in response to external pressure $P_{external}$ exceeding reference pressure $P_{reference}$ of reference cavity 14. Such a difference in pressures has caused elastically deformable membrane 20 to deform and deflect toward cavity floor 28 of reference cavity 14. In the depicted state, each of ends 20a, 20b of deformable membrane 20 traces an S-shape, having convex portions 32a, and concave portions 32b. Convex portions 32a and concave portions 32b are so described from the perspective of looking down upon top surface 30 of absolute pressure sensor 10.

When elastically deformable membrane 20 is deformed as depicted in FIG. 1B, an intimate interface between piezoresistors 22a, 22b, 24a, 24b and elastically deformable membrane 20 cause bottom portions of piezoresistors that are proximate these intimate interfaces to deform in a similar fashion as the deformation of elastically deformable membrane 20. Such convex and concave deformations are then projected throughout thickness 34 of piezoresistors 22a, 22b, 24a, 24b, respectively. The projections of convex portions 32a cause top portions of piezoresistors 22a, 22b to be in tensile stress. The projections of concave portions 32b cause top portions of piezoresistors 24a, 24b to be in compressive stress.

Piezoresistors 22a, 22b that are in tensile stress have resistances that change with a first polarity. Piezoresistors 24a, 24b that are in compressive stress have resistances that change of a second polarity, opposite that of the first polarity. For example, in some embodiments, resistance along lengths of piezoresistors 22a, 22b may increase when piezoresistors 22a, 22b are in tensile stress, and resistance along the lengths of piezoresistors 24a, 24b may decrease when piezoresistors 24a, 24b are in compressive stress. In some embodiments, piezoresistors 22a, 22b may be series connected so as to increase signal strength of a first polarity signal. Similarly piezoresistors 24a, 24b may be series connected to increase signal strength of a second polarity signal.

Various piezoresistive materials may have various piezoresistive coefficients relating strain to signal magnitude and signal polarity. Some materials may increase in resistance under tensile strain and decrease in resistance under compressive strain. Other materials my increase in resistance under compressive strain and decrease in resistance under tensile strain. Henceforth the polarity of the piezoresistive coefficient will be indicated by an arrow drawn across a resistor. Piezoresistors having resistances that increase in response to increasing pressure will be represented by an up-arrow. Piezoresistors having resistances that decrease in response to increasing pressure will be represented by a down-arrow. The arrows annotating piezoresistor symbols that are pointed in the same direction to one another indicate piezoresistors that have the same polarity of resistance change in response to changes in external pressure $P_{external}$.

Figure 2:
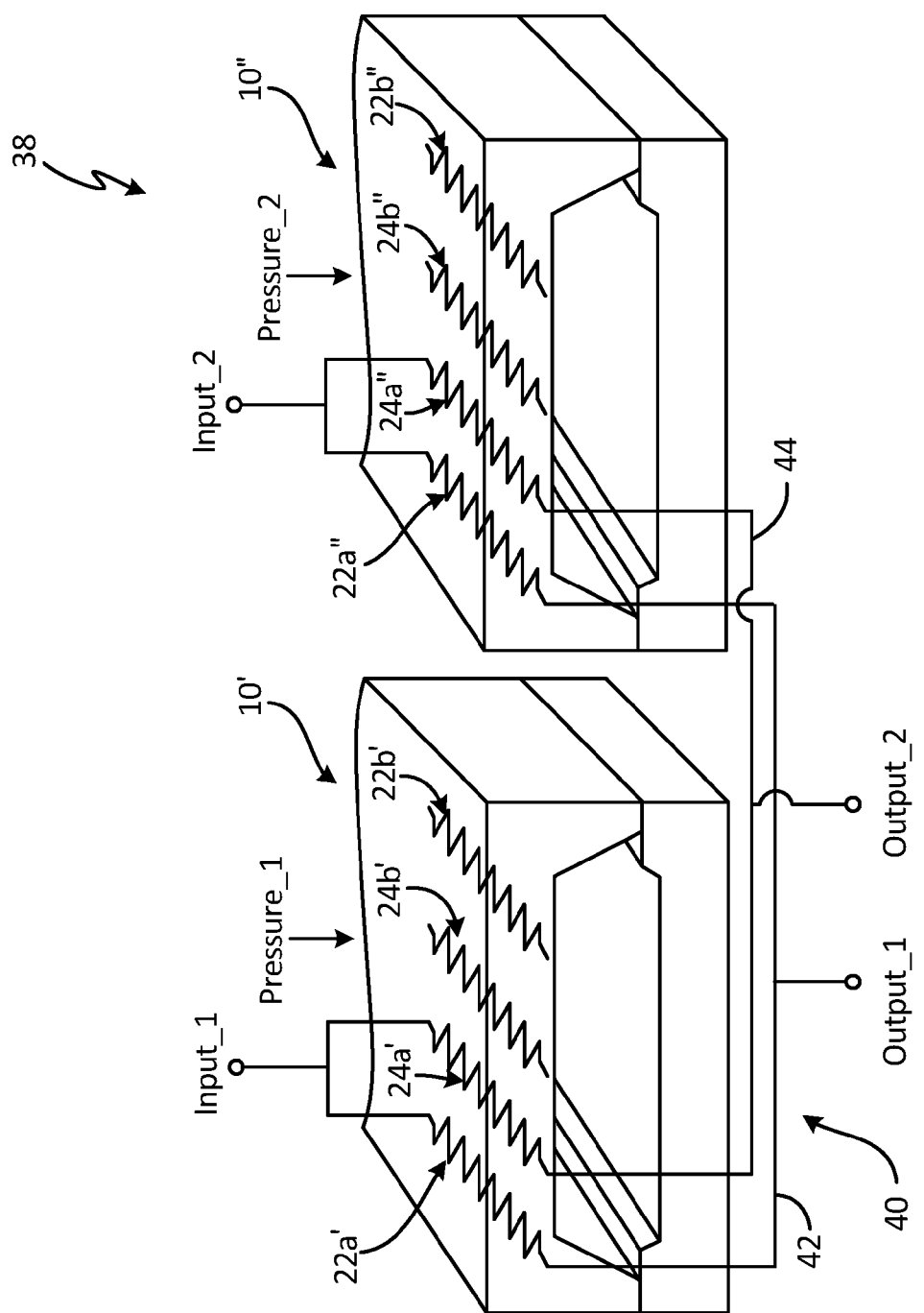
FIG. 2 is a perspective view of an exemplary pseudo differential pressure sensor configured as a Wheatstone bridge.

FIG. 2 is a perspective view of an exemplary pseudo differential pressure sensor configured as a Wheatstone bridge. In FIG. 2, pseudo differential pressure sensor 38 includes first absolute pressure sensor 10' and second absolute pressure sensor 10". First absolute pressure sensor 10' includes piezoresistors 22a', 22b', 24a', 24b'. Similarly, second absolute pressure sensor 10" includes piezoresistors 22a", 22b", 24a", 24b".

Piezoresistors 22a', 24a' of absolute pressure sensor 10' and piezoresistors 22a", 24a" of absolute pressure sensor 10" are electrically connected as Wheatstone bridge 40. Wheatstone bridge 40 includes first voltage divider leg 42 and second voltage divider leg 44. First voltage divider leg 42 includes piezoresistor 22a' of first absolute pressure sensor 10' series connected to piezoresistor 22a" of second absolute pressure sensor 10" at first output node OUTPUT_1. Second voltage divider leg 44 includes piezoresistor 24a' of first absolute pressure sensor 10' series connected to piezoresistor 24a" of second absolute pressure sensor 10" at second output node OUTPUT_2. In this way, each of first voltage divider leg 42 and second voltage divider leg 44 includes piezoresistors from both first absolute pressure sensor 10' and second absolute pressure sensor 10". Furthermore, each piezoresistors sharing a voltage divider leg 42 or 44 has the same polarity of resistance change as one another. First voltage divider leg 42 includes piezoresistors of opposite polarity of resistance change to piezoresistors of second voltage divider leg 44. By including piezoresistors from both first and second absolute pressure sensors 10', 10" in each of first and second voltage divider legs 42, 44, each of first and second voltage divider legs, 42, 44 can provide a signal indicative of a difference between the pressures PRESSURE_1, PRESSURE_2 of fluid environments to which first and second absolute pressure sensors 10', 10" are exposed.

In some embodiments, piezoresistors 22b', 24b', 22b", 24b" can be electrically connected in series with piezoresistors 22a', 24a', 22a", 24a", respectively, to increase signal strength. In some embodiments, piezoresistors 22b', 24b', 22b", 24b" can be electrically connected as a second Wheatstone bridge to provide increased redundancy.

Figure 3:
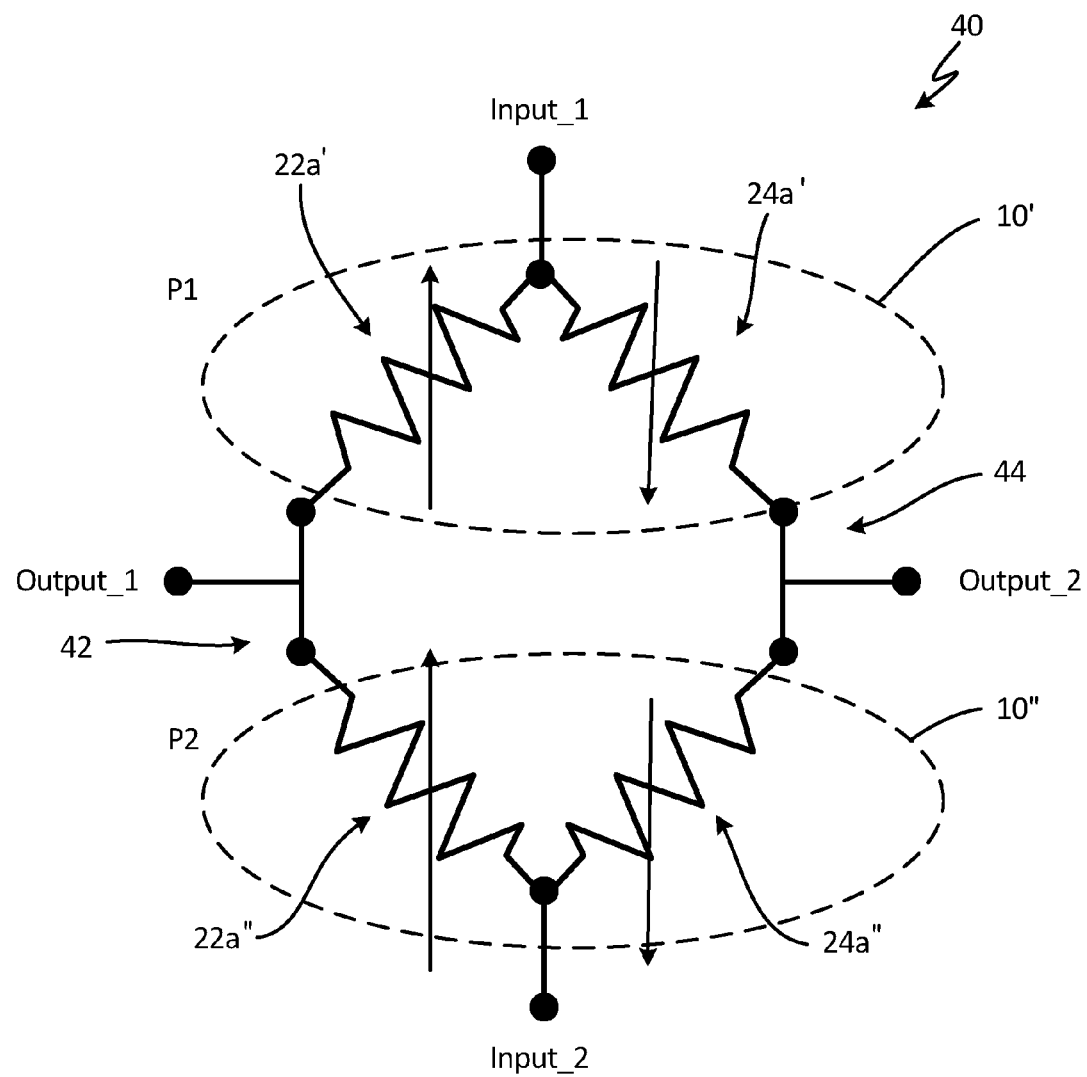
FIG. 3 is a schematic diagram of an exemplary Wheatstone bridge configuration of individual piezoresistors of two absolute temperature sensors.

FIG. 3 is a schematic diagram of an exemplary Wheatstone bridge configuration individual piezoresistors of two absolute pressure sensors. In FIG. 3, Wheatstone bridge 40 includes piezoresistors 22a', 24a' of first absolute pressure sensor 10'. Piezoresistor 22a' is part of first voltage divider leg 42, while piezo resistor 24a' is part of second voltage divider leg 44. Wheatstone bridge 40 also includes piezoresistors 22a", 24a" of second absolute pressure sensor 10". Piezoresistor 22a" is part of first voltage divider leg 42, while piezo resistor 24a" is part of second voltage divider leg 44.

In the depicted embodiment, first voltage divider leg 42 includes piezoresistors 22a', 22a", both of which are positioned in surface regions of elastically deformable membrane 20 (depicted in FIGS. 1A-1B) that become increasingly convex in response to increasing external pressure $P_{external}$. On such convex surfaces regions, tensile strain in the piezoresistors 22a', 22a" increases in response to increases in external pressure $P_{external}$. Second voltage divider leg 44 includes piezoresistors 24a', 24a", both of which are positioned in surface regions of elastically deformable membrane 20 that become increasingly concave in response to increasing external pressure $P_{external}$. On such concave regions, compressive strain in the piezoresistors 24a', 24a" increases in response to increases in external pressure $P_{external}$.

When each of absolute pressure sensors 10', 10" is exposed to fluid environments having identical pressures (e.g., Pressure_1=Pressure_2 and Preference_1=Preference_2), piezoresistors 22a', 22a" of first and second absolute pressure sensors 10', 10", respectively, will be substantially similarly deformed. Substantial similarity of deformation of piezoresistors 22a', 22a" of first and second absolute pressure sensors 10', 10", respectively, will result in substantially similar resistances of piezoresistors 22a', 22a". In such a scenario, each of piezoresistors 22a', 22a" of first voltage divider leg 42 will have substantially similar resistances. First output node OUTPUT_1 of first voltage divider leg 42 will thus be biased to approximately the average of voltages provided to first input node INPUT_1 and second input node INPUT_2. For similar reasons, second output node OUTPUT_2 of second voltage divider leg 44 also will be biased to approximately the average of voltages provided to first input node INPUT_1 and second input node INPUT_2.

If, however, each of absolute pressure sensors 10', 10" are exposed to different pressures, piezoresistors 22a', 22a" of first and second absolute pressure sensors 10', 10" will be deformed dissimilarly. Dissimilarity of deformation of piezoresistors 22a', 22a" of first and second absolute pressure sensors 10', 10", respectively, will result in dissimilar resistances of piezoresistors 22a', 22a". In such a scenario, each of corresponding piezoresistors 22a', 22a" of first voltage divider leg 42 will have dissimilar resistances. First output node OUTPUT_1 of first voltage divider leg 42 will thus be biased either above or below the average of first input node INPUT_1 and second input node INPUT_2. For similar reasons, second output node OUTPUT_2 of second voltage divider leg 44 will be biased either below or above the average of first input node INPUT_1 and second input node INPUT_2.

First output node OUTPUT_1 will be biased in an opposite direction as second output node OUTPUT_2 in response to fluid environments of different pressures to which absolute pressures sensors 10', 10" are exposed. First output nodes OUTPUT_1 and second output node OUTPUT_2, however, each provide an independent measure of the pressure differential between the two absolute pressure sensors 10', 10". Thus, even should one of first and second voltage divider legs 42 or 44 fail, one of first output signal OUTPUT_1 or second output node OUTPUT_2, which corresponds to a non-failing voltage divider leg 44 or 42, can be used to provide an output signal indicative of the differential pressure.

Figure 4:
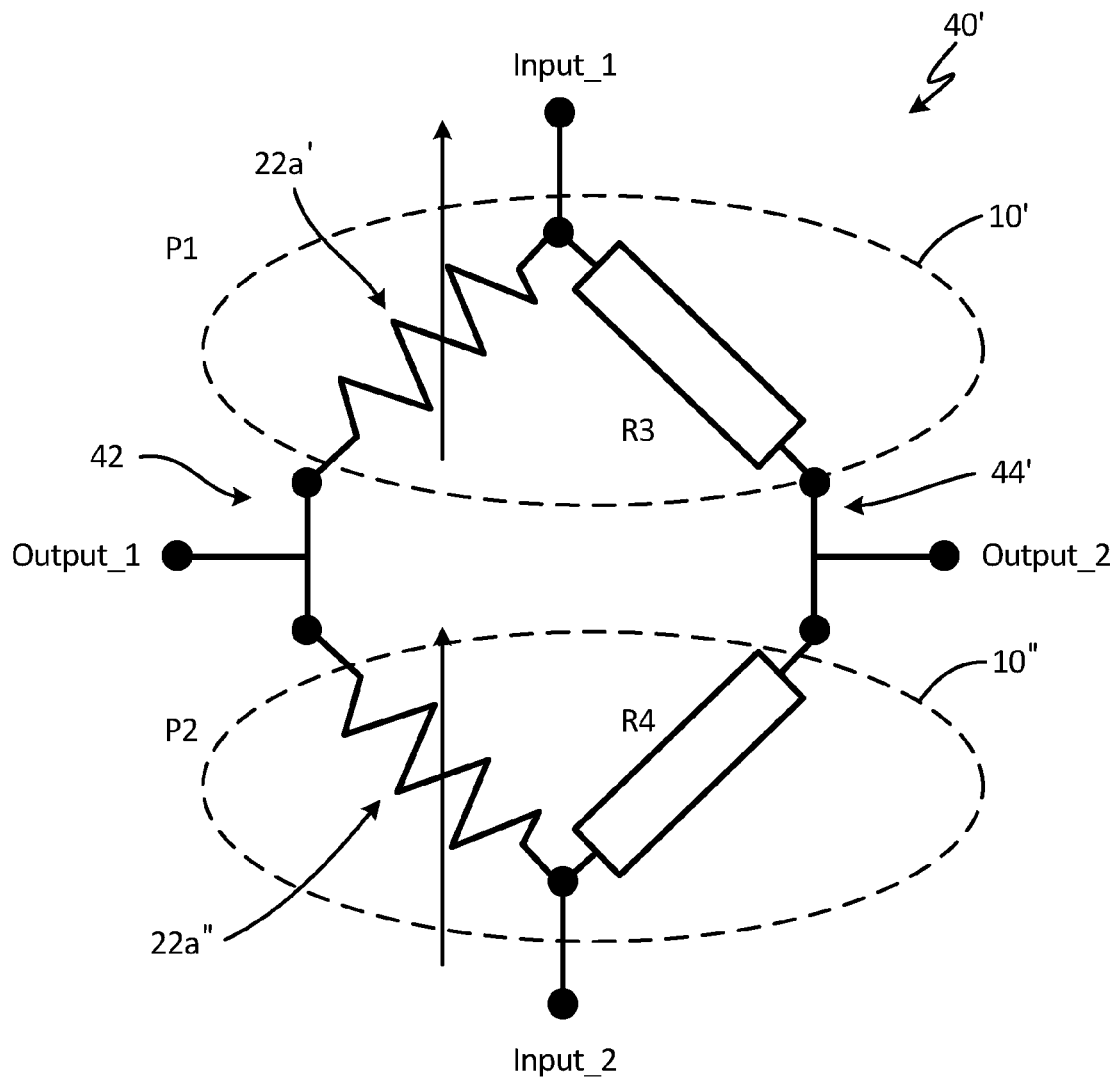
FIG. 4 is a schematic diagram of an exemplary Wheatstone bridge configuration using two piezoresistors and two reference resistors.

FIG. 4 is a schematic diagram of an exemplary Wheatstone bridge configuration using two piezoresistors and two reference resistors. In FIG. 4, Wheatstone bridge 40' includes first voltage divider leg 42 and second voltage divider leg 44'. Second voltage divider leg 44' includes resistors R3, R4 series connected at second output node OUTPUT_2. Second voltage divider leg 44' is configured to provide a reference voltage to second output node OUTPUT_2. First voltage divider leg 42 includes piezoresistors 22a', 22a" series connected at first output node OUTPUT_1. Piezoresistors 22a', 22a" have the same polarities of resistance change to one another.

Piezoresistors 22a', 22a", may both be positioned on corresponding surface regions of elastically deformable membranes 20, albeit on different absolute temperature sensors 10' and 10". Such surface regions may have a similar stress/strain or pressure/strain relation one to another. Such surface regions become increasingly convex in response to increasing external pressure $P_{external}$. A difference in the pressures (e.g., Pressure_1–Pressure_2) of the fluid environments exposed to the two absolute pressure sensors 10', 10" will result in a different convexity of the surface regions on which the two piezoresistors 22a', 22a" are located. This difference in convexities will then cause a difference in a tensile strain of piezoresistors 22a', 22a". This difference in tensile strain of piezoresistors 22a', 22a" will result in different resistances of piezoresistors 22a', 22a" causing a voltage signal at first output node OUTPUT_1 to reflect a ratio of these resistances. First output node OUTPUT_1 can be compared with the reference voltage generated by second voltage divider leg 44' at second output node OUTPUT_2.

Figure 5:
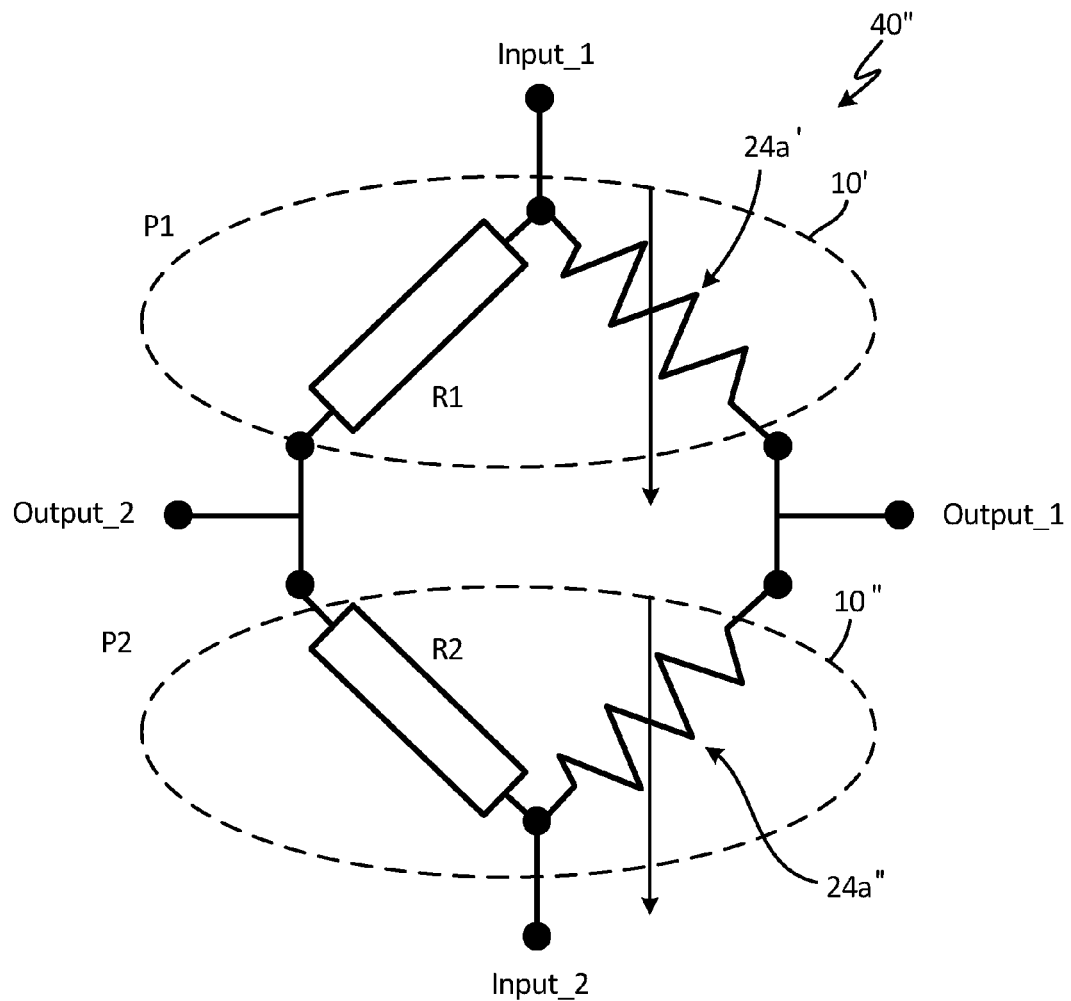
FIG. 5 is a schematic diagram of an exemplary Wheatstone bridge configuration using two piezoresistors and two reference resistors.

FIG. 5 is a schematic diagram of an exemplary Wheatstone bridge configuration using two piezoresistors and two reference resistors in a similar way as the Wheatstone bridge configuration depicted in FIG. 4. In FIG. 5, Wheatstone bridge 40" includes first voltage divider leg 42" and second voltage divider leg 44. First voltage divider leg 42" includes resistors R3, R4 series connected at first output node OUTPUT_1. First voltage divider leg 42" is configured to provide a reference voltage to first output node OUTPUT_1. Second voltage divider leg 44 includes piezoresistors 24a', 24a" series connected at second output node OUTPUT_2. Piezoresistors 24a', 25a" have the same polarities of resistance change to one another.

Piezoresistors 24a', 24a", may both be positioned on surface regions of elastically deformable membrane 20, albeit on different absolute temperature sensors 10' and 10". Such surface regions become increasingly concave in response to increasing external pressure $P_{external}$.

A difference in the pressures of the fluid environments exposed to the two absolute pressure sensors 10', 10" will result in a different concavity of the surface regions on which the two piezoresistors 24a', 24a" are located. This difference in concavities will then cause a difference in a compressive strain of piezoresistors 24a', 24a". This difference in compressive strain of piezoresistors 24a', 24a" will result in different resistances of piezoresistors 24a', 24a" causing a voltage signal at second output node OUTPUT_2 to reflect a ratio of these resistances. OUTPUT_2 can be compared with the reference voltage generated by first voltage divider leg 42" at first output node OUTPUT_1.

Figure 6:
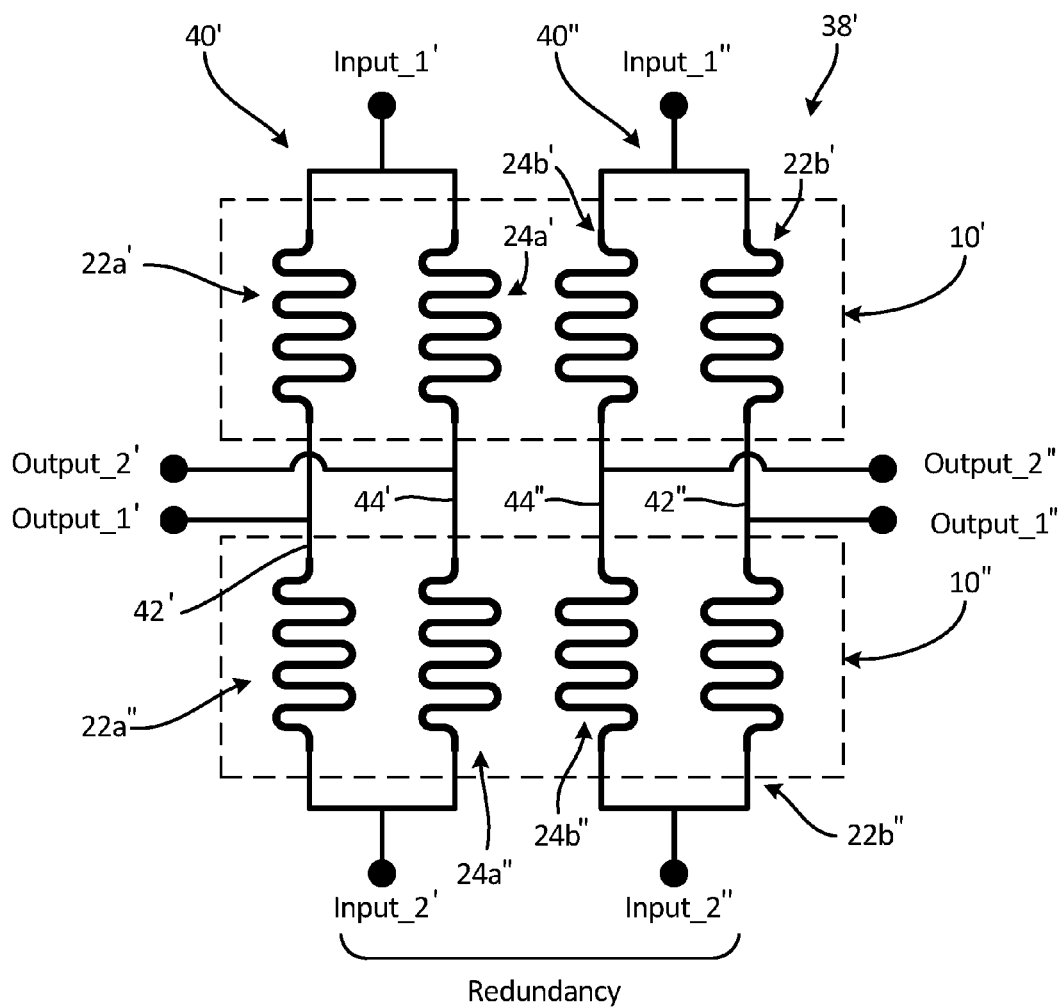
FIG. 6 is a schematic diagram of an exemplary pseudo differential pressure sensor using a Wheatstone bridge configuration of individual piezoresistors that provides redundancy.

FIG. 6 is a schematic diagram of an exemplary pseudo differential pressure sensor using a Wheatstone bridge configuration of individual piezoresistors that provides redundancy. In FIG. 6, pseudo differential pressure sensor 38' includes first absolute pressure sensor 10' and second absolute temperature sensor 10". First absolute pressure sensors 10' includes piezoresistors 22a', 22b', 24a', 24b'. Similarly, second absolute pressure sensors 10" includes piezoresistors 22a", 22b", 24a", 24b".

Piezoresistors 22a', 24a' of absolute pressure sensor 10' and piezoresistors 22a", 24a" are electrically connected as Wheatstone bridge 40'. Wheatstone bridge 40' includes first voltage divider let 42' and second voltage divider leg 44'. First voltage divider leg 42' includes piezoresistor 22a' of first absolute pressure sensor 10' is series connected to piezoresistor 22a" of second absolute pressure sensor 10" at first output node OUTPUT_1'. Second voltage divider leg 44' includes piezoresistor 24a' of first absolute pressure sensor 10' is series connected to piezoresistor 24a" of second absolute pressure sensor 10" at second output node OUTPUT_2'. In this way, each of first voltage divider leg 42' and second voltage divider leg 44' includes piezoresistors from both of first absolute pressure sensor 10' and second absolute pressure sensor 10". By including piezoresistors from both of the first and second absolute pressure sensors 10', 10" in each of first and second voltage divider legs 42', 44', each of first and second voltage divider legs, 42', 44' can provide a signal indicative of a difference between the pressures of fluid environments to which first and second absolute pressure sensors 10', 10" are exposed.

Similarly, Piezoresistors 22b', 24b' of absolute pressure sensor 10' and piezoresistors 22b", 24b" are electrically connected as Wheatstone bridge 40". Such a redundant Wheatstone bridge 40" provides two levels of redundancy. A first level of redundancy is realized by having two Wheatstone bridges 40', 40". A second level of redundancy is realized by having both first and second voltage divider legs 42', 44', 42", 44", each of is configured to provide a signal indicative of a difference in the pressure of the fluid environments exposed to the two absolute pressure sensors 10', 10".

Various embodiments may have various advantages. For example, in some embodiments, a pressure transducer may produce a voltage, current, charge, and/or resistance in response to deformation. In some such embodiments, positive relation transducers (i.e., transducers that produce a signal that increases in response to increasing pressure) of both a first and a second absolute pressure sensor can be output to a system controller. The system controller can then electrically connect these outputs to the inputs of a first differential amplifier. An output of the first differential amplifier may be indicative of a pressure differential as exposed to the first and second absolute pressure sensors.

Similarly, negative relation transducers of both the first and the second absolute pressure sensors can be output to the system controller. The system controller can then electrically connect these outputs to a second differential amplifier. An output of the second differential amplifier may be also indicative of a pressure differential. The system controller can then either use one or both of the outputs of the first and second differential amplifiers to generate a signal indicative of a pressure differential as exposed to the first and second absolute pressure sensors.

In some embodiments, a system controller is electrically coupled to Wheatstone bridge 40 via output nodes OUTPUT_1, OUTPUT_2. Input nodes INPUT_1, INPUT_2 provide operating power to Wheatstone bridge 40. Wheatstone bridge 40, when powered, generates signals on each of output nodes OUTPUT_1, OUTPUT_2, each of which is indicative of a pressure differential, albeit of opposite polarities. Such a system controller may include a microprocessor, memory, a power interface, a reference library and/or an input/output interface, for example. The memory may include program memory locations and/or data memory locations. The reference library may include predetermined thresholds, to which signals measured on output nodes OUTPUT_1, OUTPUT_2 can be compared. The microprocessor may select from using one of output nodes OUTPUT_1, OUTPUT_2 or both to generate a signal indicative of a differential pressure, based on such comparisons, for example.

The following are non-exclusive descriptions of possible embodiments of the present invention.

A pseudo differential pressure sensor includes a first absolute pressure sensor and a second absolute pressure sensor. Each of the first and the second absolute pressure sensors includes an elastically deformable membrane configured to deform in response to exposure to an environment having a pressure. Each of the first and the second absolute pressure sensors includes a first piezoresistor located on the elastically deformable membrane at a first region where increasing the pressure of the environment produces an increasing tensile strain in the first piezoresistor. Each of the first and the second absolute pressure sensors includes a second piezoresistor located on the elastically deformable membrane at a second location where increasing the pressure of the environment produces an increasing compressive strain in the second piezoresistor. The first and the second piezoresistors of both the first and second absolute pressure sensors are electrically connected in a Wheatstone bridge having a first voltage divider leg and a second voltage divider leg. The first voltage divider leg includes the first piezoresistor of the first absolute pressure sensor series connected to the first piezoresistor of the second absolute pressure sensor at a first output node. The second voltage divider leg includes the second piezoresistor of the first absolute pressure sensor series connected to the second piezoresistor of the second absolute pressure sensor at a second output node.

The pseudo differential pressure sensor of the preceding paragraph can optionally include, additionally and/or alternatively, a control system configured to supply a bias voltage across each of the first and the second voltage divider legs of the Wheatstone bridge and to receive the first output signal and the second output signal.

A further embodiment of the foregoing pseudo differential pressure sensor, wherein the first and the second output nodes may be configured to provide a first and a second output signal, respectively. Each of the first and the second output signals may be indicative of a difference between a first pressure of a first environment exposed to the first absolute pressure sensor and a second pressure of a second environment exposed to the second absolute pressure sensor. The first output signal may have an inverse relation with the second output signal.

A further embodiment of any of the foregoing pseudo differential pressure sensor, wherein, in response to application of a bias voltage applied across the first voltage divider leg of the Wheatstone bride, a first output signal at the first output node may increase in response to an increase in the difference between the first pressure and the second pressure. A further embodiment of any of the foregoing pseudo differential pressure sensor, wherein, in response to application of a bias voltage applied across the second voltage divider leg of the Wheatstone bride, a second output signal may decrease in response to an increase in the difference between the first pressure and the second pressure.

A further embodiment of any of the foregoing pseudo differential pressure sensor, wherein the control system is further configured to evaluate whether each of the first and the second output signals are within a predetermined signal range corresponding to a normal operating range. A further embodiment of any of the foregoing pseudo differential pressure sensor, wherein, upon determining that only one of the first and the second output signals is within the predetermined signal range, the control system may generate a measurement signal indicative of the difference between the first pressure and the second pressure based on the one of first and the second output signals that is within the predetermined signal range.

A further embodiment of any of the foregoing pseudo differential pressure sensor, wherein the first region where increasing pressure may produce an increasing tensile strain in the first piezoresistor is on a surface region of the elastically deformable membrane that becomes increasing convex in response to increasing pressure. A further embodiment of any of the foregoing pseudo differential pressure sensor, wherein the second region where increasing the pressure of the environment may produce an increasing compressive strain in the second piezoresistor is on a surface region of the elastically deformable membrane that becomes increasing concave in response to increasing pressure.

In some embodiments, a pseudo differential pressure sensor includes a first absolute pressure sensor and a second absolute pressure sensor. Each of the first and the second absolute pressure sensors includes an elastically deformable membrane configured to deform in response to exposure to an environment having a pressure. Each of the first and the second absolute pressure sensors includes a first piezoresistor located on a first surface region of the elastically deformable membrane that becomes increasingly convex in response to increasing pressure. Each of the first and the second absolute pressure sensors includes a second piezoresistor located on a second surface region of the elastically deformable membrane that becomes increasingly concave in response to increasing pressure. The first and the second piezoresistors of both the first and second absolute pressure sensors are electrically connected in a Wheatstone bridge having a first voltage divider leg and a second voltage divider leg. The first voltage divider leg includes the first piezoresistor of the first absolute pressure sensor series connected to the first piezoresistor of the second absolute pressure sensor at a first output node. The second voltage divider leg includes the second piezoresistor of the first absolute pressure sensor series connected to the second piezoresistor of the second absolute pressure sensor at a second output node.

The pseudo differential pressure sensor of the preceding paragraph can optionally include, additionally and/or alternatively, a control system configured to supply a bias voltage across each of the first and the second voltage divider legs of the Wheatstone bridge and to receive the first output signal and the second output signal.

A further embodiment of the foregoing pseudo differential pressure sensor, wherein the first and the second output nodes may be configured to provide a first and a second output signal, respectively, each of the first and the second output signals indicative of a difference between a first pressure of a first environment exposed to the first absolute pressure sensor and a second pressure of a second environment exposed to the second absolute pressure sensor. The first output signal may have an inverse relation with the second output signal.

A further embodiment of any of the foregoing pseudo differential pressure sensor, wherein, when a bias voltage is applied across the first voltage divider leg of the Wheatstone bride, a first output signal at the first output node may increase in response to an increase in the difference between the first pressure and the second pressure. A further embodiment of any of the foregoing pseudo differential pressure sensor, wherein, when a bias voltage is applied across the second voltage divider leg of the Wheatstone bride, a second output signal may decrease in response to an increase in the difference between the first pressure and the second pressure.

A further embodiment of any of the foregoing pseudo differential pressure sensor, wherein the control system may be further configured to evaluate whether each of the first and the second output signals are within a predetermined signal range corresponding to a normal operating range. A further embodiment of any of the foregoing pseudo differential pressure sensor, wherein, if only one of the first and the second output signals is within the predetermined signal range, then the control system may generate a measurement signal indicative of the difference between the first pressure and the second pressure based on the one of first and the second output signals that is within the predetermined signal range.

A method of generating a signal indicative of a difference between a first pressure of a first environment and a second pressure of a second environment includes exposing a first absolute pressure sensor to the first environment having the first pressure. The method includes exposing a second absolute pressure sensor to the second environment having the second pressure. The method includes generating a first output signal indicative of a difference between the first pressure of the first environment and the second pressure of the second environment. The method includes generating a second output signal indicative of a difference between the first pressure of the first environment and the second pressure of the second environment. The second output signal is complementary to the first output signal. The method includes selecting a measurement signal from among the first output signal, the second output signal and the difference signal. The measurement signal is indicative of the difference between the first pressure of the first environment and the second pressure of the second environment.

The method of the preceding paragraph can optionally include, additionally and/or alternatively, outputting the measurement signal. A further embodiment of the foregoing method, wherein selecting from among the first output signal, the second output signal and the difference signal may include: i) comparing each of the first output signal and the second output signal with each of a high reference signal and a low reference signal; and ii) selecting the difference signals if both the first output signal and the second output signal are between the high reference signal and the low reference signal.

A further embodiment of any of the foregoing methods, wherein selecting from among the first output signal, the second output signal and the difference signal further may include selecting, if only one of the first and the second output signals is between the high and the low reference signals, the one of the first and the second output signals that is between the high and the low reference signals.

While the invention has been described with reference to an exemplary embodiment(s), it will be understood by those skilled in art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A pseudo differential pressure sensor comprising:
a first absolute pressure sensor; and
a second absolute pressure sensor,
wherein each of the first and the second absolute pressure sensors comprises:
an elastically deformable membrane configured to deform in response to exposure to an environment having a pressure;
a first piezoresistor located on the elastically deformable membrane at a first region where increasing the pressure of the environment produces an increasing tensile strain in the first piezoresistor; and
a second piezoresistor located on the elastically deformable membrane at a second region where increasing the pressure of the environment produces an increasing compressive strain in the second piezoresistor, and
wherein the first and the second piezoresistors of both the first and the second absolute pressure sensors are electrically connected as a Wheatstone bridge having a first voltage divider leg and a second voltage divider leg, the first voltage divider leg including the first piezoresistor of the first absolute pressure sensor series connected to the first piezoresistor of the second absolute pressure sensor at a first output node, the second voltage divider leg including the second piezoresistor of the first absolute pressure sensor series connected to the second piezoresistor of the second absolute pressure sensor at a second output node.

2. The pseudo differential pressure sensor of claim 1, wherein the first and the second output nodes are configured to provide a first and a second output signal, respectively, each of the first and the second output signals indicative of a difference between a first pressure of a first environment exposed to the first absolute pressure sensor and a second pressure of a second environment exposed to the second absolute pressure sensor, the first output signal having an inverse relation with the second output signal.

3. The pseudo differential pressure sensor of claim 2, wherein, in response to application of a bias voltage applied across the first voltage divider leg of the Wheatstone bride, a first output signal at the first output node increases in response to an increase in the difference between the first pressure and the second pressure.

4. The pseudo differential pressure sensor of claim 2, wherein, in response to application of a bias voltage applied across the second voltage divider leg of the Wheatstone bride, a second output signal decreases in response to an increase in the difference between the first pressure and the second pressure.

5. The pseudo differential pressure sensor of claim 2, further comprising a control system configured to supply a bias voltage across each of the first and the second voltage divider legs of the Wheatstone bridge and to receive the first output signal and the second output signal.

6. The pseudo differential pressure sensor of claim 5, wherein the control system is further configured to evaluate whether each of the first and the second output signals are within a predetermined signal range corresponding to a normal operating range.

7. The pseudo differential pressure sensor of claim 6, wherein, upon determining that only one of the first and the second output signals is within the predetermined signal range, the control system generates a measurement signal indicative of the difference between the first pressure and the second pressure based on the one of first and the second output signals that is within the predetermined signal range.

8. The pseudo differential pressure sensor of claim 1, wherein the first region where increasing pressure produces an increasing tensile strain in the first piezoresistor is on a surface region of the elastically deformable membrane that becomes increasing convex in response to increasing pressure.

9. The pseudo differential pressure sensor of claim 1, wherein the second region where increasing the pressure of the environment produces an increasing compressive strain in the second piezoresistor is on a surface region of the elastically deformable membrane that becomes increasing concave in response to increasing pressure.

10. A pseudo differential pressure sensor comprising:
a first absolute pressure sensor; and
a second absolute pressure sensor,
wherein each of the first and the second absolute pressure sensors comprises:
an elastically deformable membrane configured to deform in response to an exposure to an environment having a pressure;
a first piezoresistor located on a first surface region of the elastically deformable membrane that becomes increasingly convex in response to increasing pressure; and
a second piezoresistor located on a second surface region of the elastically deformable membrane that becomes increasingly convex in response to increasing pressure, and
wherein the first and the second piezoresistors of both the first and the second absolute pressure sensors are electrically connected as a Wheatstone bridge having a first voltage divider leg and a second voltage divider leg, the first voltage divider leg including the first piezoresistor of the first absolute pressure sensor series connected to the first piezoresistor of the second absolute pressure sensor at a first output node, the second voltage divider leg including the second piezoresistor of the first absolute pressure sensor series connected to the second piezoresistor of the second absolute pressure sensor at a second output node.

11. The pseudo differential pressure sensor of claim 10, wherein the first and the second output nodes are configured to provide a first and a second output signal, respectively, each of the first and the second output signals indicative of a difference between a first pressure of a first environment exposed to the first absolute pressure sensor and a second pressure of a second environment exposed to the second absolute pressure sensor, the first output signal having an inverse relation with the second output signal.

12. The pseudo differential pressure sensor of claim 11, wherein, when a bias voltage is applied across the first voltage divider leg of the Wheatstone bride, a first output signal at the first output node increases in response to an increase in the difference between the first pressure and the second pressure.

13. The pseudo differential pressure sensor of claim 11, wherein, when a bias voltage is applied across the second voltage divider leg of the Wheatstone bride, a second output signal decreases in response to an increase in the difference between the first pressure and the second pressure.

14. The pseudo differential pressure sensor of claim 11, further comprising a control system configured to supply a bias voltage across each of the first and the second voltage divider legs of the Wheatstone bridge and to receive the first output signal and the second output signal.

15. The pseudo differential pressure sensor of claim 14, wherein the control system is further configured to evaluate whether each of the first and the second output signals are within a predetermined signal range corresponding to a normal operating range.

16. The pseudo differential pressure sensor of claim 15, wherein, if only one of the first and the second output signals is within the predetermined signal range, then the control system generates a measurement signal indicative of the difference between the first pressure and the second pressure based on the one of first and the second output signals that is within the predetermined signal range.

17. A method of generating a signal indicative of a difference between a first pressure of a first environment and a second pressure of a second environment, the method comprising:
exposing a first absolute pressure sensor to the first environment having the first pressure;
exposing a second absolute pressure sensor to the second environment having the second pressure;
generating a first output signal indicative of a difference between the first pressure of the first environment and the second pressure of the second environment;
generating a second output signal indicative of a difference between the first pressure of the first environment and the second pressure of the second environment, the second output signal being complementary to the first output signal;
calculating a difference signal between the first output signal and the second output signal; and
selecting a measurement signal from among the first output signal, the second output signal and the difference signal for use as a signal indicative of a difference between the pressure of the first environment and the pressure of the second environment,
wherein the measurement signal is indicative of the difference between the first pressure of the first environment and the second pressure of the second environment.

18. The method of claim 17, further comprising:
outputting the measurement signal.

19. The method of claim 17, wherein selecting from among the first output signal, the second output signal and the difference signal comprises:

comparing each of the first output signal and the second output signal with each of a high reference signal and a low reference signal; and selecting the difference signals if both the first output signal and the second output signal are between the high reference signal and the low reference signal.

20. The method of claim 19, wherein selecting from among the first output signal, the second output signal and the difference signal further comprises:

selecting, if only one of the first and the second output signals is between the high and the low reference signals, the one of the first and the second output signals that is between the high and the low reference signals.

* * * * *